US006269621B1

United States Patent
Fischier et al.

(10) Patent No.: US 6,269,621 B1
(45) Date of Patent: Aug. 7, 2001

(54) ROTOR ASSEMBLY AND LAWNMOWER HAVING SUCH A ROTOR ASSEMBLY FOR CUTTING GRASS AT A PLURALITY OF LEVELS

(75) Inventors: Mats Fischier, Båstad; Sture Larsson, Veberöd, both of (SE)

(73) Assignee: Mats Fischier i Båstad AB, Båstad (SE)

( * ) Notice: Subject to any disclaimer, the term of this patent is extended or adjusted under 35 U.S.C. 154(b) by 0 days.

(21) Appl. No.: 09/586,597

(22) Filed: Jun. 2, 2000

Related U.S. Application Data (63) Continuation of application No. PCT/SE98/02176, filed on Nov. 30, 1998.

(30) Foreign Application Priority Data

Dec. 4, 1997 (SE) .................................................. 9704505

(51) Int. Cl.⁷ .................................................. A01D 34/73
(52) U.S. Cl. ............................................ 56/255; 56/320.2
(58) Field of Search .......................... 56/17.4, 255, 295, 56/320.1, 320.2, 17.5, DIG. 17, DIG. 20

(56) References Cited

U.S. PATENT DOCUMENTS

| 990,998 | 5/1911 | Malding . | |
|---|---|---|---|
| 2,701,942 | * 2/1955 | Caldwell, Jr. et al. | 56/320.2 |
| 3,032,957 | * 5/1962 | Boyer | 56/320.1 |
| 3,057,140 | * 10/1962 | Ridenour et al. | 56/320.1 |
| 3,091,905 | 6/1963 | Aiken, Jr. . | |
| 3,665,693 | * 5/1972 | Dacus et al. | 56/320.1 |
| 3,971,199 | * 7/1976 | Buchele | 56/320.2 |
| 4,351,144 | 9/1982 | Benenati . | |
| 5,199,251 | * 4/1993 | Rouse et al. | 56/255 |
| 5,619,846 | * 4/1997 | Brown | 56/255 |

FOREIGN PATENT DOCUMENTS

| 2468289 | 5/1981 | (FR) . |
| 9629853 A1 | 10/1996 | (WO) . |

* cited by examiner

Primary Examiner—Robert E. Pezzuto
(74) Attorney, Agent, or Firm—Birch, Stewart, Kolasch & Birch, LLP (57) ABSTRACT

A rotor assembly for lawn mowing comprising at least one rotor operating at a plurality of cutting levels. The rotor assembly has an abutment structure which is arranged at least at the upper cutting levels and has supporting points adjacent to the rotor to keep grass upright while being cut by the rotor.

16 Claims, 5 Drawing Sheets

ROTOR ASSEMBLY AND LAWNMOWER HAVING SUCH A ROTOR ASSEMBLY FOR CUTTING GRASS AT A PLURALITY OF LEVELS

This application is a continuation of PCT International Application No. PCT/SE98/02176 filed on Nov. 30, 1998, which designated the United States, and on which priority is claimed under 35 U.S.C. §120, the entire contents of which are hereby incorporated by reference.

FIELD OF THE INVENTION

The present invention relates to a rotary lawnmower and more specifically to a rotor assembly for lawn mowing having a rotor, which operates at a plurality of cutting levels, and a rotary lawnmower having such a rotor assembly.

BACKGROUND OF THE INVENTION

A traditional rotary lawnmower cuts grass at a pre-set cutting level. The cut grass normally stays on the fresh-cut lawn and will then be visible in a distinct and often unpleasant manner. For this reason, the grass is often collected and carried away from the lawn. This collection can be performed, for instance, by the cut grass being directly brought into a collecting container or by the cut grass being raked together after the cutting of the lawn. This is, however, disadvantageous since nourishment is removed from the lawn.

To solve this problem systems for disintegrating the grass have been developed. Hence the grass can be restored to the lawn in a way that is appealing to the eye since the disintegrated grass can penetrate into the lawn and thus become less noticeable. In addition, the cut grass degrades faster when it is cut into pieces.

One type of such rotary lawnmowers maintains the cut grass in the cover of the rotor and causes chopping knives to chop it, after which the small pieces fall down on the lawn. According to a second type of rotary lawnmower, the cut grass is put on the lawn, after which the knives of the rotary lawnmower engage the cut grass once again and chop it into small pieces. The problem of these types is that the cutting quality depends on the cutting conditions. In many cases, the grass which is cut from the lawn is only beaten around by the chopping knives without being hit and thus chopped, and if the grass should happen to be wet, the cut grass tends to be rubbed rather than chopped by the rotor knives.

A third type of rotary lawnmower, which solves the above problems, comprises a rotor which theoretically operates at a plurality of cutting levels. In this case, the rotor is arranged so as to first operate at the highest cutting level, and then successively down to the lowest. The grass is thus cut by steps, only a small piece of each blade of grass being cut in each step. Examples of such rotary lawnmowers are disclosed in FR 2,468,289, U.S. Pat. No. 4,351,144 and WO 96/29853. Since the grass is cut successively down to the desired height, so-called topping, the above-mentioned "beating" problem is eliminated. There is, however, a disadvantage of this type of lawnmower as well. It has appeared in practical application that the rotor does not operate in the intended manner. If the grass is high, the parts of the rotor which operate at the higher cutting levels will not be able to top the grass because when the lawnmower is travelling, the grass is first applied against the cover of the rotor, whereby the grass is bent forwards. Subsequently, when the grass thus bent forwards enters the rotor, this bending forwards of the grass is maintained and enhanced by the flow of air caused by the rotor. Consequently, at these higher cutting levels the grass escapes being hit and thus being cut by the rotor. Hence, it is only the intermediate and low parts of the rotor that cut the grass in a fairly efficient manner, which implies that a large piece of each blade of grass will be cut off. This results in the inconvenience of having an unpleasant accumulation of cut grass on the fresh-cut lawn.

The object of the present invention is to provide a rotor assembly and a rotary lawnmower of the above-mentioned second type, which secure a satisfactory disintegration of the grass, even if the grass is high.

SUMMARY OF THE INVENTION

The object is achieved by a rotor assembly comprising at least one rotor operating at a plurality of levels, the rotor assembly having an abutment structure which is arranged at least at the upper cutting levels and has supporting points adjacent to the rotor to keep grass upright while being cut by the rotor.

As a result, a rotor assembly is provided which yields an improved disintegration of grass when cutting the same, even if it is high. The improved disintegration is secured by the abutment structure, whose supporting points prevent the grass from bending owing to the flow of air caused by the rotor. Thus, the grass will be cut at all the levels at which the rotor operates, whereby the desired disintegration of the grass is achieved.

Preferably, the abutment structure is arranged outside the rotor.

According to a preferred embodiment, the abutment structure is arranged directly adjacent to the rotor.

Hence a scissors cutting action can be provided to secure an excellent cutting quality.

According to another embodiment, the position of the abutment structure is adjustable in relation to the rotor.

This makes it possible to adjust the cutting quality. If a better cutting quality is desired, the position of the abutment structure is adjusted so that it is arranged directly adjacent to the knives of the rotor.

Preferably, the abutment structure constitutes a part of or a part intended for a cover of the rotor, the abutment structure being arranged at a portion of the cover which is the front portion seen in the travelling direction of the rotor assembly.

By the abutment structure being arranged at the front side of the rotor assembly, it is secured that the abutment structure holds up grass which is unaffected by the rotor.

Preferably, the supporting points are evenly distributed along the front portion of the cover and the rotor is arranged to apply grass to the supporting points by its rotation, whereby the grass is cut when the rotor passes the respective supporting points.

Preferably, the abutment structure comprises apertures permitting grass to pass through to the rotor.

By the abutment structure being provided with apertures, the grass is permitted to pass through to the rotor at the same time as the grass is kept upright by the supporting points of the abutment structure as the lawnmower travels.

Preferably, the supporting points are formed of side edges of the apertures.

Preferably, the apertures are arranged in vertical planes, which are parallel with the travelling direction of the rotor assembly. Alternatively, the apertures can be arranged in vertical planes extending radially to the rotational axis of the rotor.

Preferably, the abutment structure comprises lifting means extending from the rotor assembly in its travelling direction to raise lying grass while advancing the rotor assembly.

According to one embodiment of the invention, the rotor comprises a knife means extending radially to or away from a rotor centre, the knife means being formed in such manner that a radially outer portion operates at a high cutting level and a radially inner portion operates at a low cutting level.

The knife means can be so formed that its cutting level decreases in an infinitely variable manner or by steps from the outer portion to the inner portion.

According to yet another embodiment of the invention, the rotor comprises, at a radially outermost portion, a knife means, which is formed in such manner as to operate at the different cutting levels, a first part of the knife means, which first part operates at a high cutting level, being arranged in front of a second part of the knife means, seen in the rotational direction of the rotor, which second part operates at a low cutting level.

This secures that all the operating parts of the knife means operate with the same cutting width while at the same time the topping function of the rotor is secured.

Further, the invention relates to a rotary lawnmower comprising at least one rotor assembly according to that stated above.

This results in a rotary lawnmower, which secures a satisfactory cutting of grass, even if the grass is high.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE EMBODIMENTS

Figures 1, 2:
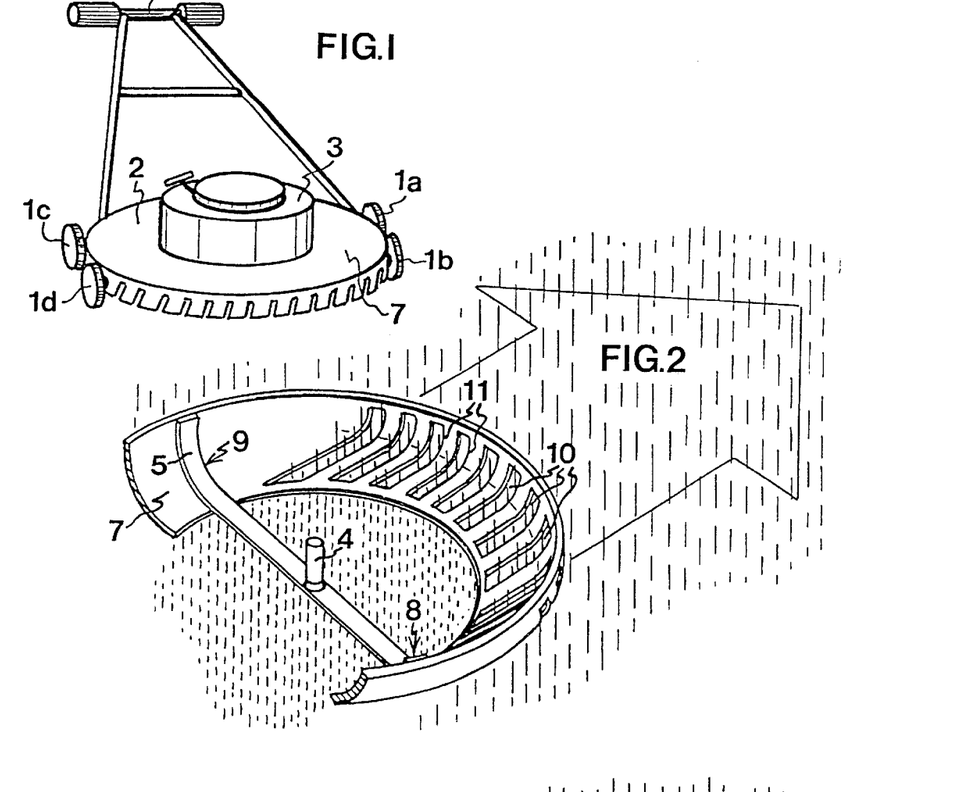
FIG. 1 is a perspective view of a rotary lawnmower according to one embodiment of the present invention.
FIG. 2 is a schematic perspective view of a rotor and an associated abutment structure of the embodiment in FIG. 1.

A rotary lawnmower according to the present invention is shown in FIG. 1 and has a cover 2 supported by four wheels 1a, 1b, 1c, 1d. The cover 2 supports a motor 3, which has an output shaft 4 (shown in FIG. 2) extending through the cover 2 and supporting in its turn a rotor 5. The rotor 5 is partially enclosed by the cover 2. Finally, a handle bar 6 is mounted at the rear side of the cover 2, seen in the travelling direction of the rotary lawnmower, which handle bar 6 extends backwards-upwards.

An abutment structure 7 is mounted at the front side of the cover 2. The design of the abutment structure 7 and the rotor 5 is shown more clearly in FIG. 2. The rotor 5 is connected to the motor shaft 4 so as to rotate about the same during operation of the motor 3. The two peripheral portions 8, 9 of the rotor 5 are bent upwards, whereby the rotor 5, when rotating, operates at a plurality of cutting levels. In reality, the rotor 5 operates in an infinitely variable manner between a highest cutting level and a lowest cutting level. The abutment structure 7 is arranged immediately outside the rotor 5 and has been given the same bent shape as the peripheral portions 8, 9 of the rotor 5. It is important that the abutment structure 5 is arranged at least at the upper cutting levels of the rotor 5 since it is at these levels that grass normally bends under the influence of the flow of air caused by the rotor 5. It is, of course, also possible to arrange the abutment structure 7 at all the cutting levels of the rotor 5. The abutment structure 7 is made of a plate having a shape which is complementary to the operating portions 8, 9 of the rotor 5, in which plate a plurality of apertures are made in the form of slits 10. The plate can be mounted at the front, lower side of the cover 2 or constitute a part of the front, lower side of the cover 2. The slits 10 extend in vertical planes, which are parallel with the travelling direction of the lawnmower, the one side edge 11 of each slit 10 forming supporting points for grass, which passes through to the rotor 5 via the slits 10.

During operation of the rotary lawnmower, it is made to travel over a lawn. The bent shape of the rotor 5 secures that the grass is cut from the top downwards into small pieces, whereby the cut grass, after being put on the lawn, can penetrate into the lawn and thus become less noticeable. As the lawnmower travels, the grass is let through to the rotor 5 via the slits 10 of the abutment structure 7. Thus, the grass will not be bent forwards by the cover 2, as is the case with traditional lawnmowers. By its rotation, the rotor 5 will subsequently and in proper order apply the grass, which has been let through each slit 10, to one of the side edges 11 of each slit 10. In this case, the side edges 11 serve as supporting points for the grass, which is thereby prevented from bending under the influence of the flow of air caused by the rotor 5, thereby securing the cutting of the grass. During the travelling of the lawnmower, a blade of grass, which has recently been cut in one position of the slit 10, will be passed further into said slit 10 to a new position, whereby a new piece of the blade of grass will project up to the rotor 5, which can thus cut the new piece of grass.

Figure 3:
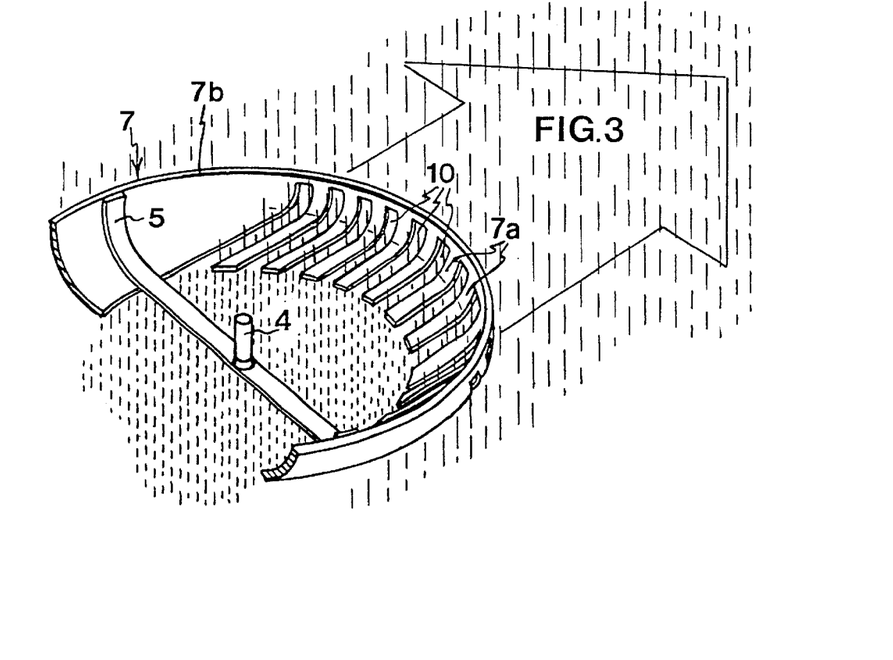
FIG. 3 is a schematic perspective view of a rotor and an associated abutment structure according to an alternative embodiment.

FIG. 3 shows an alternative embodiment of the abutment structure 7 shown in FIG. 2. The abutment structure 7 is here formed of a plurality of flat bars 7a, which are intended to be fixed at the lower edge of the cover 2 in FIG. 1 with the aid of a means of attachment 7b. The flat bars 7a are mounted at a mutual distance to provide apertures 10, which correspond to the slits 10 in FIG. 2 and extend in vertical planes, which are parallel with the travelling direction of the lawnmower, whereby the apertures 10 formed between the flat bars 7a also extend in vertical planes which are parallel with said travelling direction. Also in this embodiment, the abutment structure 7, i.e. the flat bars 7a, has been given a shape which is complementary to that of the rotor 5. The main difference between this embodiment and the embodiment described with reference to FIG. 2 is that the apertures 10 in this embodiment do not have a closed circumference. The lower ends of the apertures 10 are open, thus eliminating the risk of grass getting stuck at this end. As to the rest, the function of the abutment structure 7 is similar to that of the abutment structure 7 according to FIG. 2.

Figures 4, 5:
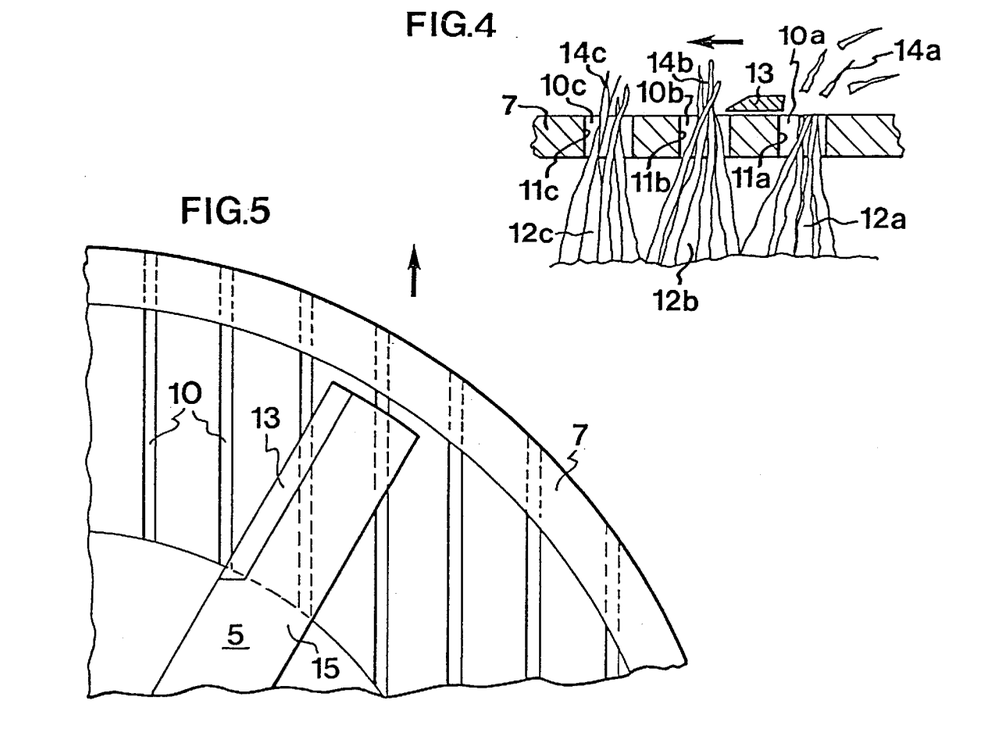
FIG. 4 is a schematic view of the cooperation of the rotor and an abutment structure.
FIG. 5 is a partial top view of a rotor and an associated abutment structure.

The cooperation between the rotor 5 and the abutment structure 7 is shown more clearly in FIG. 4, to which reference is now made. FIG. 4 shows three slits 10a, 10b, 10c in the abutment structure 7. The grass 12a, 12b, 12c has been distributed to the three slits 10a, 10b, 10c and the grass tops 14a, 14b, 14c have been made to protrude via these slits up to the rotor 5. A schematically illustrated knife 13 of the rotor 5 has passed the first slit 10a and cut the grass tops 14a protruding through the same. The knife 13 is now approaching the second slit 10b by the rotational movement of the rotor in the direction shown by the arrow. As the knife 13 continues to rotate, the grass tops 14b protruding through this slit 10b will be applied against the one side edge 11b of the second slit 10b. The side edge 11b provides supporting points for the grass 12b in question and its tops 14b, thus preventing the grass 12b from bending. The grass tops 14b of the thus-upright grass 12b will subsequently be cut by means of the knife 13.

Consequently, the abutment structure 7 secures that the grass 12a, 12b, 12c is upright in the moment of cutting and cannot bend so that it avoids being hit by the knife 13 of the rotor 5.

Depending on how close to the knife 13 of the rotor the abutment structure 7 is arranged, different cutting effects can be achieved. If the abutment structure 7 is arranged outside and immediately adjacent to the knife 13, the grass tops 14a–c will be cut with a scissors cutting action. Thus, a fine cutting surface is achieved, which results in a good cutting quality. If the abutment structure 7 is arranged at a small distance from the knife, such as in the range of a centimeter, the resulting cutting action will be a combination of said scissors cutting action and the cutting action of a traditional rotary lawnmower, in which the tops of grass are mowed by means of the rotor knife. Since the grass 12a–c in FIG. 4 is supported at the side edges 11a–c of the slits 10a–c, it is only the piece of the grass tops 14a–c located between the abutment structure 7 and the knife 13 that will be subject to a shearing action at the moment of cutting. This piece is considerably smaller than the corresponding piece in traditional cutting, but bigger than when using a scissors cutting action. Advantageously, the rotary lawnmower according to the present invention comprises means for adjusting the distance between the knives 13 of the rotor 5 and the abutment structure 7.

FIG. 5, to which reference is now made, is a top view of a rotor 5 and an associated abutment structure 7 according to the invention. The rotor 5 comprises an arm 15 and knives 13 (of which only one is shown) which are each arranged at one end of the arm 15. It clearly appears that the slits 10 in the abutment structure 7 are formed so as to extend in vertical planes, which are parallel with the travelling direction of the lawnmower shown by the arrow.

The number of slits or apertures as well as the width of the slits or the apertures can, of course, vary. The vertical extent of the plate or the flat bars can also vary.

Figure 6:
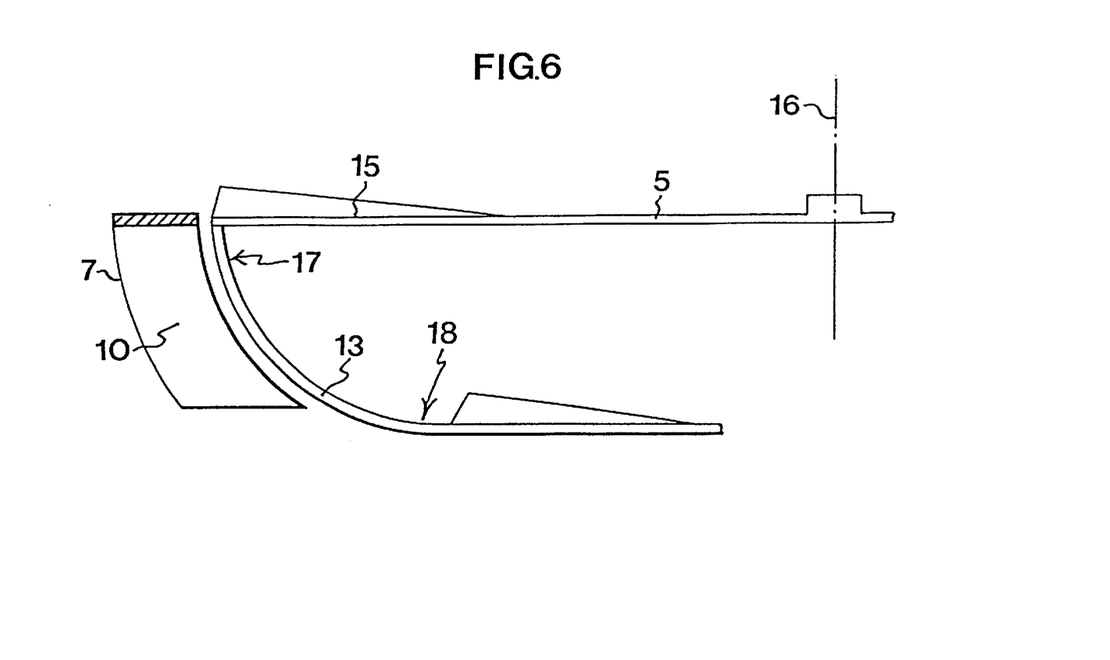
FIG. 6 is a partial cross-sectional view of a first embodiment of the abutment structure and the rotor.

FIG. 6 is a partial view of a first embodiment of the rotor 5 and the abutment structure 7 according to the invention. The knife 13 of this embodiment is formed so as to curve downwards, in under the arm 15 and extend towards the rotational axis 16 of the rotor 5. This makes the knife 13 of the rotor 5 operate in an infinitely variable manner between a highest cutting level at the outermost portion 17 of the knife 13 and a lowest cutting level at the innermost portion 18 of the knife 13. The abutment structure 7 is arranged immediately outside the rotor 5 except at its lowest cutting levels. In the abutment structure 7, the slits 10 are made according to that described with reference to FIG. 5.

When using a rotary lawnmower according to this embodiment, grass will be cut in an infinitely variable manner by the knives 13 of the rotor 5, larger pieces of the grass being cut at the outer portions 17 of the rotor 5 and smaller pieces being cut at the inner portions 18 of the rotor 5, whereas the abutment structure 7 secures that supporting points are arranged at the upper cutting levels of the rotor 5 to keep the grass upright at these levels.

Figure 7:
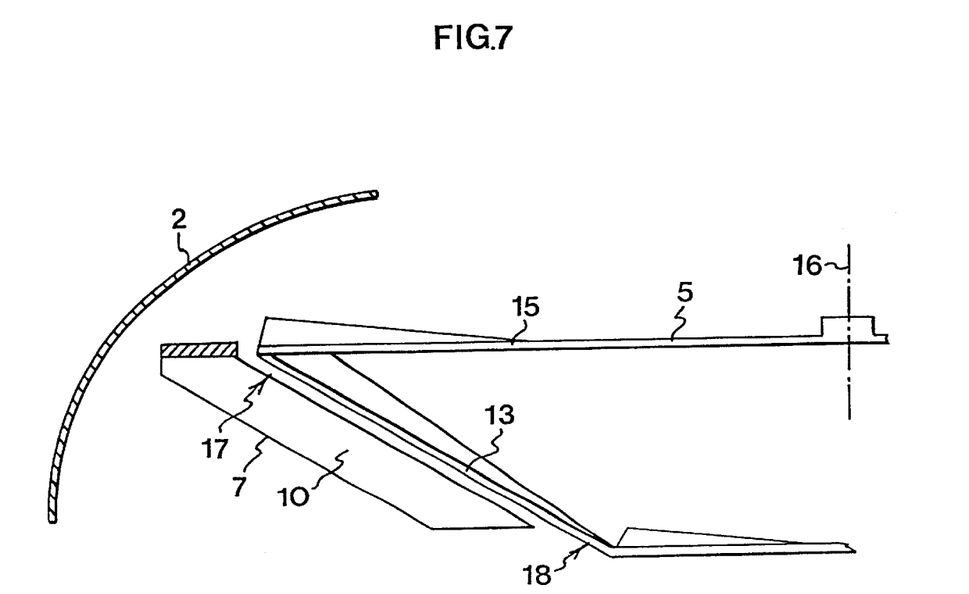
FIG. 7 is a partial cross-sectional view of a second embodiment of the abutment structure and the rotor.

FIG. 7 is a partial view of a second embodiment of the rotor 5 and the associated abutment structure 7. In this case, the knife 13 is formed so as to be inclined inwards under the arm 15 and extend towards the rotational axis 16 of the rotor 5. This makes the knife 13 of the rotor 5 operate in an infinitely variable manner between a highest cutting level at the outermost portion 17 of the knife 13 and a lowest cutting level at the innermost portion 18 of the knife 13. The abutment structure 7 comprises apertures 10, which are arranges in vertical planes, which are parallel with the travelling direction of the rotary lawnmower, and is further arranged immediately outside the rotor 5 except at its lowest cutting levels. When using a rotary lawnmower according to this embodiment, grass will be cut in an infinitely variable manner in equally large pieces by the knife 13 of the rotor 5 along the extent of the same.

FIG. 7 also illustrates a preferred mounting of the abutment structure 7 in relation to the cover 2. More specifically, the abutment structure 7 constitutes a part intended for the cover 2 and is mounted in the same so that the cover 2 surrounds the abutment structure 7. This results in the rotor 5 and the abutment structure 7 being screened off from the surroundings in a reliable manner, thereby providing a rotary lawnmower which is safe to use.

Figure 8:
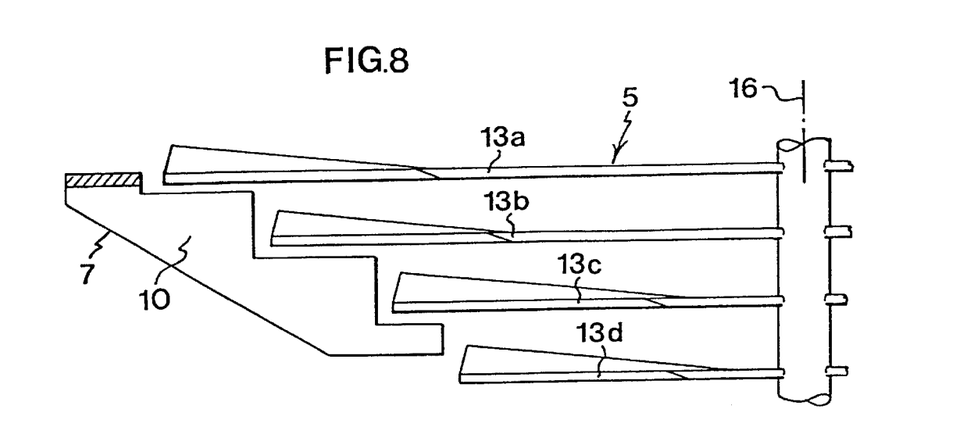
FIG. 8 is a partial cross-sectional view of a third embodiment of the abutment structure and the rotor.

FIG. 8 is a partial view of a third embodiment of the rotor 5 and the associated abutment structure 7. In this embodiment, the rotor 5 has four knives 13a, 13b, 13c, 13d at each end (only one end is shown), which knives 13a, 13b, 13c, 13d operate at different levels, a knife 13a, 13b, 13c operating at a higher cutting level being arranged outside a knife 13b, 13c, 13d operating at a lower cutting level. An abutment structure 7 is arranged outside the rotor 5 at the three upper cutting levels for keeping grass upright at these levels. When using a rotary lawnmower according to this embodiment, equally large pieces of grass will be cut by steps by the knives 13a, 13b, 13c, 13d of the rotor 5.

According to an alternative design (not shown) of this embodiment, the knives are arranged to be inclined, so that each knife operates at a plurality of cutting levels, a radially outer portion of each knife operating at a higher level than a radially inner portion of the respective knives. In this connection, the abutment structure has been given a complementary shape. This results in the grass being cut in an infinitely variable manner.

Figure 9:
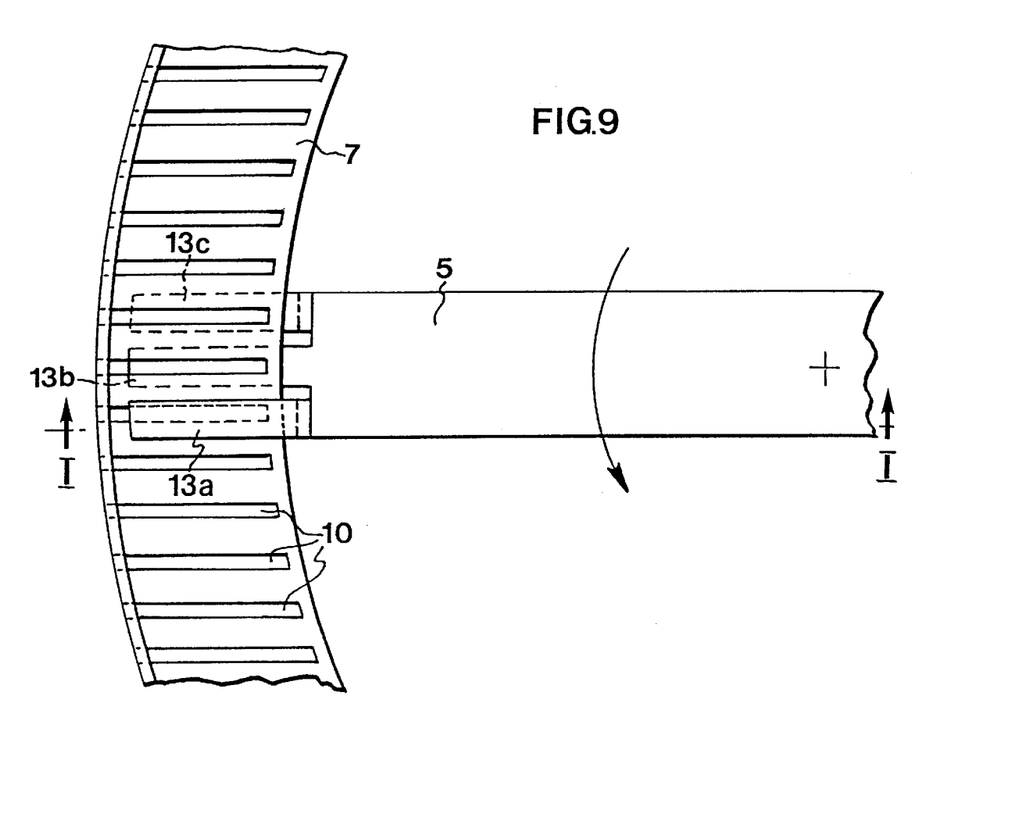
FIG. 9 is a partial top view of a fourth embodiment of the abutment structure and the rotor.
Figure 10:
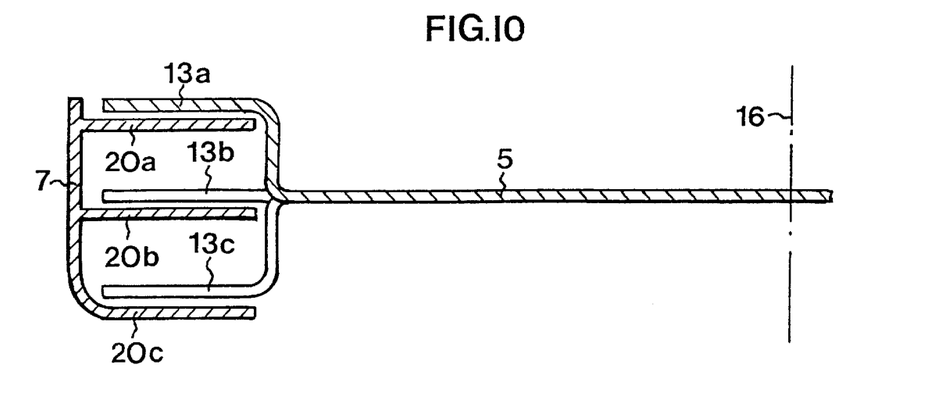
FIG. 10 is a cross-sectional view along the line I—I in FIG. 9 of the embodiment shown in FIG. 9.

According to a fourth embodiment of the invention, which is shown in FIGS. 9 and 10, the rotor 5 is formed in such manner that its two peripheral portions (of which only one is shown) comprise knives 13a, 13b, 13c operating at different cutting levels. In this connection, it should be secured that the knives 13a, 13b operating at upper cutting levels are arranged, seen in the rotational direction of the rotor 5 shown by the arrow, in front of the knives 13b, 13c operating at lower cutting levels for the grass to be cut at the different cutting levels in the right order. This design of the rotor 5 implies a special design of the abutment structure 7, which consists of a plate having the shape shown in FIGS. 9–10. The plate comprises flanges 20a, 20b, 20c, each arranged immediately under a knife 13a, 13b and 13c, respectively. Slits 10 are made in the plate and its flanges 20a, 20b, 20c in vertical planes, which are parallel with the travelling direction of the lawnmower. This embodiment of the invention is advantageous compared to the embodiments described above in the sense that all the knives 13a, 13b, 13c operate with the same cutting width.

Figures 11, 12, 13:
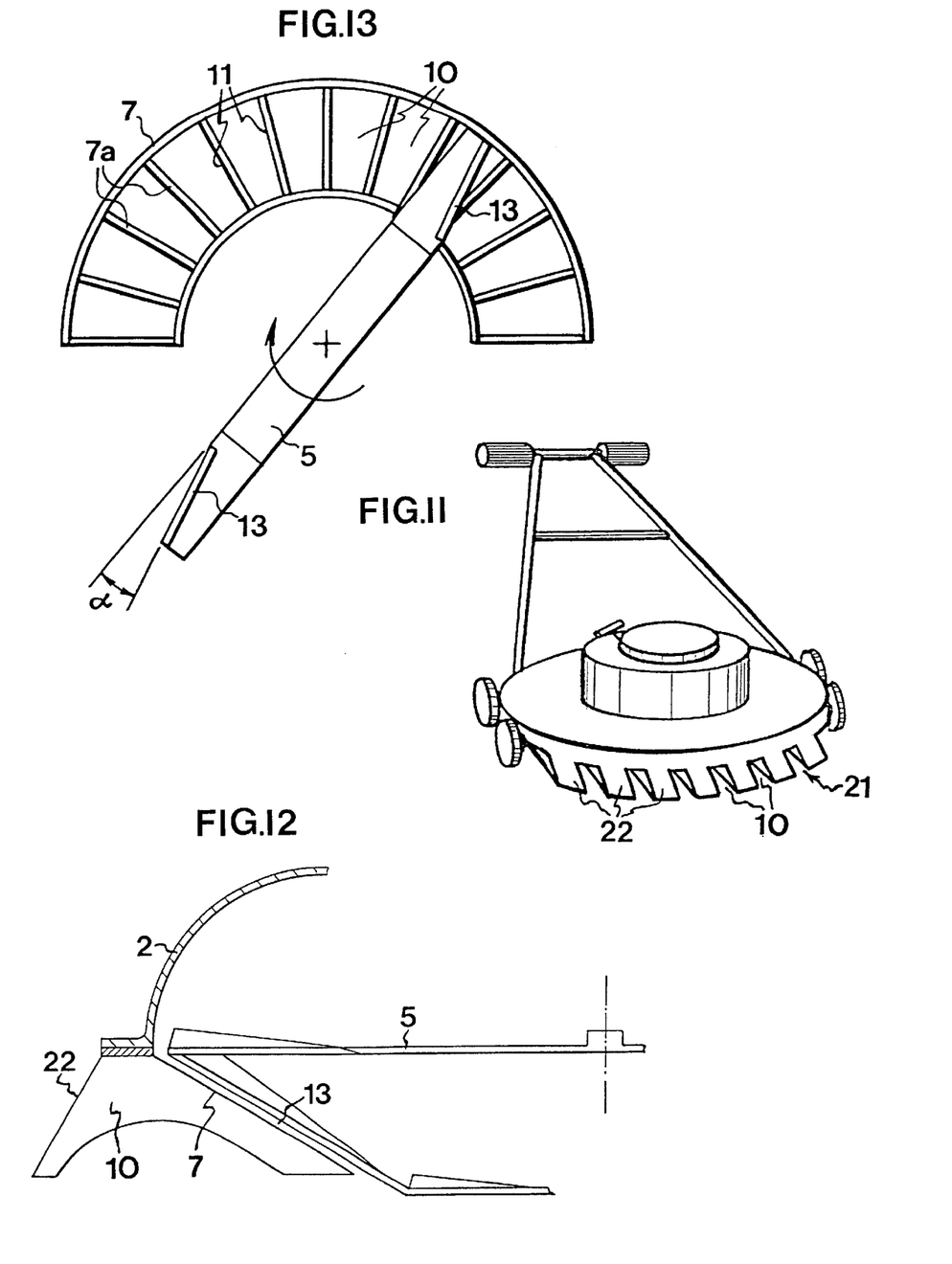
FIG. 11 is a perspective view of a rotary lawnmower according to an embodiment of the invention, which has a lifting means mounted at its front side in the travelling direction.
FIG. 12 is a cross-sectional view of the rotor, the abutment structure and the lifting means of the embodiment in FIG. 11.
FIG. 13 is a top view of a rotor and an associated abutment structure according to yet another embodiment of the present invention.

According to an embodiment of the invention shown in FIGS. 11 and 12, the rotary lawnmower comprises lifting means 21 for lifting lying grass. The lifting means 21 is arranged in front of the abutment structure 7 and consists of surfaces 22 inclined forwards and downwards. The apertures 10 formed in the abutment structure 7 also extend through the lifting means 21. This secures that grass, which has become so long as to be flattened or is flattened for some other reason, is raised and thus can be made to protrude up to the rotor 5 through the apertures 10. The lifting means can, of course, be designed in some other suitable manner, the important thing being the lifting and raising effect on lying grass.

Possible fields of application of the rotor assembly according to the present invention are cutting of lawns in private gardens, in parks, on golf courses or the like. It is also possible to use the present invention in farming for treating grass and other pasture plants.

It will be appreciated that the present invention is not limited to the described embodiments.

An alternative embodiment of the abutment structure 7 shown in FIG. 13 is made up of iron struts 7a in such manner that the supporting points of the side edges 11 of the apertures 10, to which supporting points the rotor 5 applies the grass in proper order, extend radially inwards to the rotational centre of the rotor 5. Thus the supporting points will be arranged substantially perpendicular to the rotational direction of the rotor 5 shown by the arrow, i.e. substantially in parallel to the actual rotor 5 when it occupies the respective angular positions of the supporting points. This results in an angle of application, i.e. the angle between the rotational direction of the rotor 5 and the supporting points, which secures optimal cutting.

Alternatively, such an abutment structure can be provided by using vertically arranged plates, which are aligned with the travelling direction of the lawnmower. The end of each plate which faces the rotor is formed with a slit to form flaps, which can be bent towards the rotational centre of the rotor. The profile of this end of the plate is, of course, adapted to correspond to the profile of the rotor.

In the case of radially arranged supporting points in the abutment structure 7, the rotor 5 is, advantageously, so designed that its knives 13 are placed at an angle α, as shown in FIG. 13. This angle a results in the knives 13 being arranged at an angle to the supporting points of the abutment structure 7, thereby causing a scissors cutting action, which, as previously mentioned, improves the cutting quality. When advancing a lawnmower having an abutment structure according to this embodiment, the grass will bounce from aperture 10 to aperture 10, and to facilitate this the width of each aperture 10 is comparatively great compared to the width of the iron struts 7a.

In an abutment structure having apertures, which extend in vertical planes which are parallel with the travelling direction of the lawnmower, the angle of application will, of course, vary as a function of the rotational position of the rotor in relation to the supporting points formed of the side edges of the apertures. The angle of application in the area around "twelve o'clock", seen in the travelling direction of the lawnmower, is substantially 90°, whereas the angle of application of a rotor which rotates counter-clockwise successively increases towards "three o'clock" and successively decreases towards "nine o'clock". For this reason, it may be sufficient to modify the abutment structure in the areas around "three o'clock" and "nine o'clock" in the above manner to secure that the angle of application does not become smaller or larger than a certain range of angles, within which range a satisfactory cutting result is achieved.

It is also possible to design the rotor as a disk instead of as an arm, the knives of the rotor disk being arranged at the different cutting levels along the circumference of the disk.

It goes without saying that other designs of the rotor and its knives than those shown are conceivable.

It is also possible to design the cutting edges of the knives in different ways. For instance, the edge can be waved or saw-toothed. In a similar manner, the abutment structure can also be formed with a wave shape or saw-tooth shape to improve the cutting effect.

It is further possible for a rotary lawnmower to comprise more than one rotor.

In addition, it is possible to design the abutment structure so that it extends inwards under the rotor and covers its underside. This makes it possible to dispose of the wheels of the lawnmower and let the abutment structure support the lawnmower. When the lawnmower travels, it will slide on the abutment structure while the apertures in the abutment structure allow grass to pass to the rotor.

The rotary lawnmower can be a riding lawnmower, the person who operates the lawnmower being carried by the same.

It is not necessary that the wheels, which support the lawnmower, be arranged outside the rotor. It is also possible for one of the wheels to be arranged under the rotor, whereby that wheel cannot affect uncut portions of the lawn during operation of the rotary lawnmower. In this connection, the wheel can be placed at an angle to provide a rotor having as small an overall height as possible.

Finally, it is also possible to design a rotor according to that stated above for use as an accessory of an agricultural vehicle, such as a tractor.

It will thus be understood that the cutting level of the rotor should be adjusted to the field of application in question. In the case of the rotor assembly according to the present invention being included in an agricultural implement, for instance, for the production of ensilage, the cutting level can be about 1 m, whereas in the case of the inventive rotor assembly being mounted in, for instance, a lawnmower for cutting putting greens, the cutting level can be about 1 cm.

It will thus be understood that all modifications, combinations and variations are comprised by the invention, which is only defined and delimited by the appended claims.

What is claimed is:

1. A rotor assembly for a lawnmower comprising at least one rotor operating at a plurality of cutting levels and arranged to successively cut grass from a highest cutting level to a lowest cutting level, and an abutment structure having supporting points arranged adjacent to the rotor at least at upper cutting levels to keep grass upright while being cut by the rotor.

2. The rotor assembly according to claim 1, wherein the abutment structure is arranged outside the rotor.

3. The rotor assembly according to claim 2, wherein the abutment structure is arranged directly adjacent to the rotor.

4. The rotor assembly according to claim 2, wherein the position of the abutment structure is adjustable in relation to the rotor.

5. The rotor assembly according to claim 1, wherein the abutment structure constitutes a part of or a part intended for a cover of the rotor, the abutment structure being arranged at a portion of the cover which is the front portion seen in the travelling direction of the rotor assembly.

6. The rotor assembly according to claim 5, wherein the supporting points are evenly distributed along the front portion of the cover, and that the rotor is arranged, by its rotation, to apply grass to the supporting points, whereby the grass is cut when the rotor passes the respective supporting points.

7. The rotor assembly according to claim 1, wherein the abutment structure comprises apertures permitting grass to pass through to the rotor.

8. The rotor assembly according to claim 7, wherein the supporting points are formed of side edges of the apertures.

9. The rotor assembly according to claim 7, wherein the apertures are arranged in vertical planes, which are parallel with the travelling direction of the rotor assembly.

10. The rotor assembly according to claim 7, wherein the apertures are arranged in vertical planes extending radially to the rotational axis of the rotor.

11. The rotor assembly according to claim 1, wherein the abutment structure comprises lifting means extending from the rotor assembly in its travelling direction to raise lying grass while advancing the rotor assembly.

12. The rotor assembly according to claim 1, wherein the rotor comprises knife means extending radially to or away from a rotor center, the knife means being formed in such a manner that a radially outer portion operates at a high cutting level and a radially inner portion operates at a low cutting level.

13. The rotor assembly according to claim 12, wherein the cutting level of the knife means decreases in an infinitely variable manner from the radially outer portion to the radially inner portion.

14. The rotor assembly according to claim 12, wherein the cutting level of the knife means decreases by steps from the radially outer portion to the radially inner portion.

15. The rotor assembly according to claim 1, wherein the rotor comprises, at a radially outermost portion, knife means, which is formed in such a manner as to operate at the different cutting levels, a first part of the knife means, which first part operates at a high cutting level, being arranged in front of a second part of the knife means, seen in the rotational direction of the rotor, which second part operates at a low cutting level.

16. The rotary lawnmower, wherein the lawnmower comprises at least one rotor assembly according to claim 1.

* * * * *